United States Patent [19]

Takayama

[11] Patent Number: 5,337,153
[45] Date of Patent: Aug. 9, 1994

[54] IMAGE TRANSFORMING DEVICE FOR CHANGING FRAME FREQUENCIES OF A VIDEO IMAGE

[75] Inventor: Jun Takayama, Tokyo, Japan
[73] Assignee: Sony Corporation, Tokyo, Japan
[21] Appl. No.: 826,829
[22] Filed: Jan. 28, 1992

[30] Foreign Application Priority Data

Jan. 31, 1991 [JP] Japan .................... 3-032085

[51] Int. Cl.$^5$ .............................................. H04N 7/01
[52] U.S. Cl. ............................................................ 348/441
[58] Field of Search .................. 358/140, 11, 133, 160;
H04N 7/01

[56] References Cited

U.S. PATENT DOCUMENTS

| | | | |
|---|---|---|---|
| 4,870,489 | 9/1989 | Ducret | 358/140 |
| 4,958,226 | 9/1990 | Haskell et al. | 358/136 |
| 4,985,765 | 1/1991 | Fernando | 358/140 X |
| 4,999,705 | 3/1991 | Puri | 358/136 |
| 5,062,064 | 10/1991 | Lamnabhi et al. | 358/140 X |
| 5,113,255 | 5/1992 | Nagata et al. | 358/136 |
| 5,128,754 | 7/1992 | Dhein | 358/140 X |
| 5,134,464 | 7/1992 | Basile | 358/12 |
| 5,136,377 | 8/1992 | Johnson et al. | 358/140 X |
| 5,191,416 | 3/1993 | Dickson et al. | 358/140 |
| 5,241,383 | 8/1993 | Chen et al. | 358/136 |

Primary Examiner—Victor R. Kostak
Attorney, Agent, or Firm—William S. Frommer; Alvin Sinderbrand

[57] ABSTRACT

An image transforming device transforms images by transforming video signals into a spatial frequency range, by frame-interpolating the transformed signals in the spatial frequency range and by reversely transforming such signals. In such a device, a portion moving isolated in a frame can be frame-interpolated in such a manner that the isolated motion is dispersed over the entire frame. Thus, even when a frame contains an isolated moving portion, the device can provide a natural image, effectively avoiding degradation of image quality.

5 Claims, 2 Drawing Sheets

IMAGE TRANSFORMING DEVICE FOR CHANGING FRAME FREQUENCIES OF A VIDEO IMAGE

BACKGROUND OF THE INVENTION

The present invention relates to an image transforming device such as a frame synchronizer, Conventionally, image transforming devices such as frame synchronizers have employed a variety of means to transform video signal formats, For example, Japanese Laid-Open No, 62-186683 proposes a method in which some of the image data are deleted or repeated frame by frame. Such a method easily changes frame frequencies.

On the other hand, Japanese Laid-Open No. 62-35788 proposes a method for changing frame frequencies in which image data of a frame are formed from data of the preceding and subsequent frames by using a linear interpolation technique. Another method may be considered in which frame-interpolation is performed, instead of using the linear interpolation technique, according to a time function expressing change in image data, the time function being detected in each panel.

In such ways, the above methods form video signals which produce smooth motions by and large, compared with methods in which image data is partially detected simply frame by frame.

These conventional image transforming methods have a problem in that when an image containing a moving portion is transformed, degradation of image quality is inevitable. To solve that problem, Japanese Laid-Open No. 62-25587 proposes a method in which frame-interpolation is performed using a method for detecting motions.

In this method, a moving image portion is extracted from a video signal and only the image data from that portion is formed, while a still image portion is simply taken from the preceding or subsequent frame. In this method, however, it is necessary that the suitable algorithm, i.e., the algorithm for either motion detection or frame-interpolation, be selected according to an image.

Therefore, the described method has a problem in that a transformed image appears unnatural in a case where an entire frame being slowly panned has a portion with an isolated motion unrelated to the panning movement, such as a football moving across a panned frame.

SUMMARY OF THE INVENTION

In view of the foregoing, an object of the present invention is to provide an image transforming device which performs frame-interpolation avoiding image-quality degradation effectively.

The foregoing object and other objects of the invention have been achieved by the provision of an image transforming device comprising: a transformation circuit transforming an inputted video signal into perpendicularly intersected frequency components $f_0, f_1, \ldots, f_{n-1}, f_n$; an interpolating circuit for generating frequency components $f_0 T, f_1 T, \ldots, f_{n-1} T, f_n T$ which are frame-interpolated according to changes in the frequency components $f_0, f_1, \ldots, f_{n-1}, f_n$ with a progression of frames; and a reverse transformation circuit for transforming the frame-interpolated frequency components $f_0 T, f_1 T, \ldots, f_{n-1} T, f_n T$ reversely to the transformation of the transformation circuit.

Even when a frame includes a portion with an isolated motion, image-quality degradation is effectively avoided and thus a natural image can be obtained since the isolated motion is dispersed over the entire frame by transforming the inputted video signal into perpendicularly intersected frequency components $f_0, f_1, \ldots, f_{n-1}, f_n$, and generating frequency components $f_0 T, f_1 T, \ldots, f_{n-1} T, f_n T$ which are frame-interpolated according to changes in the frequency components $f_0, f_1, \ldots, f_{n-1}, f_n$ with progression of frames, and reversely transforming the generated frequency components.

The nature, principle and utility of the invention will become more apparent from the following detailed description when read in conjunction with the accompanying drawings in which like parts are designated by like reference numerals or characters,

DETAILED DESCRIPTION OF THE INVENTION

Preferred embodiments of this invention will be described with reference to the accompanying drawings:

The First Embodiment

Figure 1:
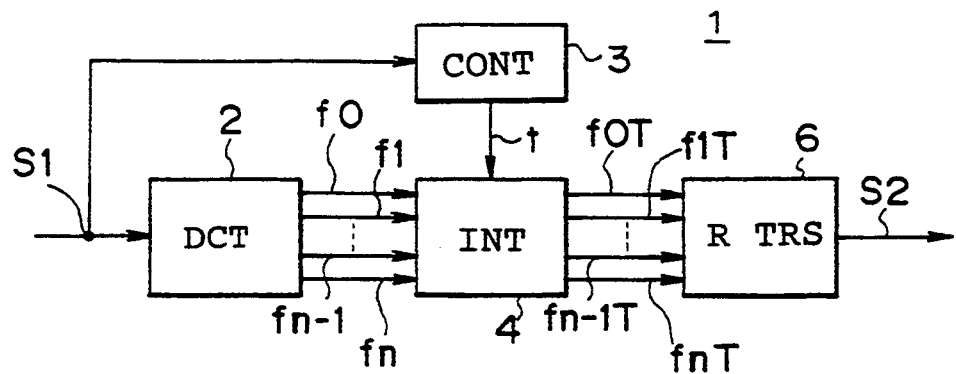
FIG. 1 is a block diagram of a frame synchronizer according to one embodiment of the present invention.

FIG. 1 shows a frame synchronizer 1, i.e. the entire system shown, which transforms input color signals S1 of a frame frequency of 60 Hz into output color signals S2 at a frame frequency of 50 Hz. The frame synchronizer 1 transforms the color signal S1 into a digital signal to express the color signal S1 in image data composed of 500×500 pixels before it sends signal S1 the color to a discrete cosine transformation circuit (DCT) 2.

The discrete cosine transformation circuit 2, using the discrete cosine transformation method, expresses the color signal S1 in 500×500 frequency components $f_0, f_1, \ldots, f_n$ some of which are horizontal and the other vertical, i.e. which are perpendicularly intersected, and thus it expresses the color signal S1 in a spatial frequency range, In such a manner, a change in level of a color signal S1 due to an isolated motion in a frame can be expressed as a change in each of the frequency components $f_0, f_1, \ldots, f_n$ in the entire frame.

A controlling circuit 3 receives reference signals respectively synchronized with color signals S1 and S2 and generates time information t which expresses a position of the frame-interpolation of the color signal S2, Further, by successively receiving the results of the comparison between signals S1 of successive frames, the controlling circuit 3 successively detects degrees of inter-frame correlation of the color signals S1 and detects scene changes in the color signals S1.

An interpolating circuit 4 takes up frequency components $f_0, f_1, \ldots, f_n$ inputted at a frame frequency of 60 Hz successively in order, and detects a time function expressing change in each of the frequency components $f_0, f_1, \ldots, f_n$. Further, referring to the time functions as the standard and using the time information outputted by the controlling circuit 3, the interpolating circuit 4 processes each of the frequency components f0, f1, ..., fn under the interpolation operation, and thus generates successive data of frequency components f0T, f1T, ..., fnT at a frame frequency of 50 Hz.

As described above, the frame synchronizer 1 transforms a color signal S1 into the desired frequency range before frame-interpolation, and thus effectively avoids degradation of the image of the color signal S1. Because the color signal S1 is transformed into the desired frequency range, an isolated motion in a frame can be received as changes in frequency components of the entire frame and thus can be expressed in a form dispersed over the frame.

Therefore, even in the case where a frame contains a portion moving isolatedly, frame-interpolation can be performed in such a manner that the isolated motion is dispersed over the frame, because frame-interpolation is performed in the frequency range. Then, by reversely transforming the frame-interpolated frequency components, image-quality degradation can be effectively avoided and thus a natural image can be produced. In such frame-interpolation, the interpolating circuit 4 generates time functions according to the results detected by the controlling circuit 3 so that the time function of each of the frequency components f0, f1, ..., fn discontinues at portion of scene change.

When the interpolating circuit 4 performs the interpolation operation using the time functions, the interpolating circuit 4, based on the time functions, performs frame-interpolation with the frequency components of either the preceding or the subsequent frame at a portion with a scene change. At a portion having no scene change, the circuit 4 performs frame-interpolation with the frequency components of both the precedent and the subsequent frames. Because of such an operation, the frame synchronizer 1 can transform the color signal S1 having a scene change portion into the color signal S2 without any unnatural change, A reverse transformation circuit 6 reversely transforms each of the frame-interpolated frequency components and thus generates the color signal S2 at a frame frequency of 50 Hz, Thus, the frame synchronizer 1 can transform the color signal S1 into the spatial frequency range for frame-interpolation and change frame frequencies, effectively avoiding degradation of image quality, In such a construction as described above, the signal S1 at the frame frequency of 60 Hz is transformed into image data of 500×500 pixels, which are then transformed into the frequency range by the discrete cosine transformation circuit 2. After detection of a time function of each of the frequency components f0, f1, ..., fn, each frequency component is frame-interpolated with reference to the time function, Thus, data of successive frequency components are generated at a frame frequency of 50 Hz, The frequency components are reversely transformed by the reverse transformation circuit 6. In this way, the color signal S1 is transformed into the spatial frequency range and is frame-interpolated, and frame frequencies are changed, without any practical degradation of image quality, According to the above described construction, the color signal is transformed into the spatial frequency range and is frame-interpolated before the reverse transformation, Therefore, even in a case where a frame contains a portion moving isolatedly, frame-interpolation can be performed in such a manner that the isolated motion is dispersed over the frame, and thus, degradation of image quality can be effectively avoided, i.e. a natural image can be produced.

The Second Embodiment

Figure 2:
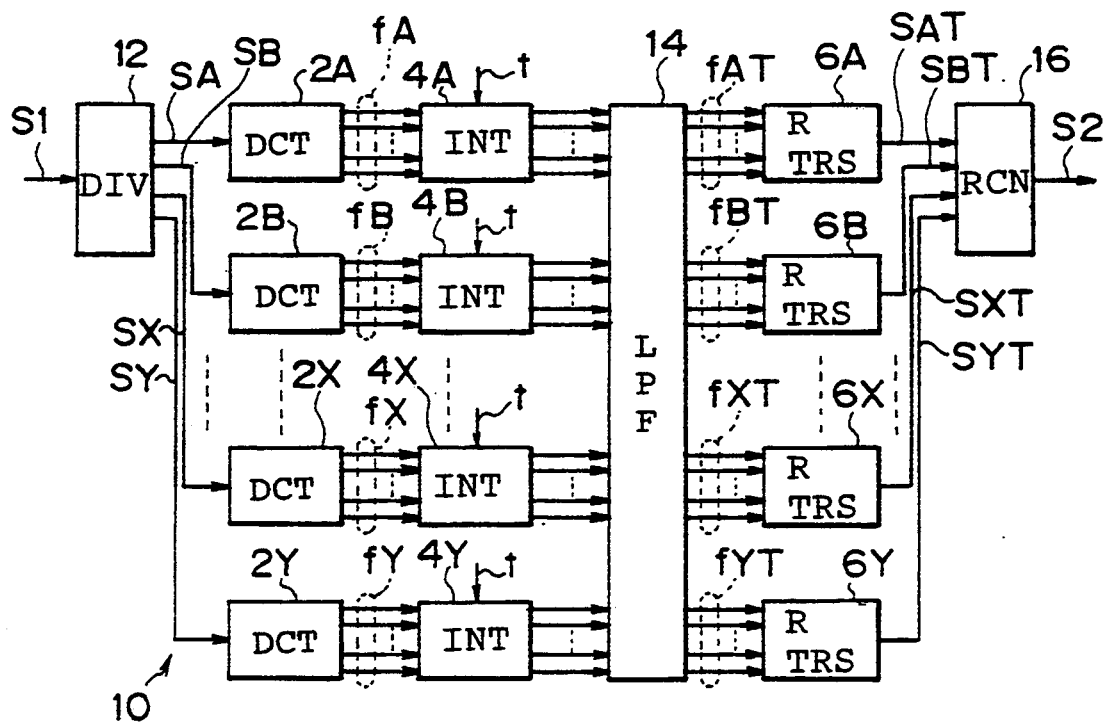
FIG. 2 is a block diagram of a second embodiment of the present invention.

With reference to FIG. 2, where parts corresponding to those in FIG. 1 are denoted by the same numerals, a frame synchronizer 10, i.e. the entire system shown, performs discrete cosine transformation by dividing a frame into a plurality of blocks instead of performing transformation simply frame by frame. In the frame synchronizer 10, a dividing circuit 12 divides an image formed by a color signal S1 into 5×5 blocks by selectively outputting the color signal S1.

Discrete cosine transformation circuits 2A to 2Y process, by the discrete cosine transformation, the respective block color signals SA to SY. The frequency components obtained are frame-interpolated by the respective interpolating circuits 4A to 4Y. Since the frame synchronizer 10 performs discrete cosine transformation and frame-interpolation for each of the blocks, the whole system can be simplified compared with a frame synchronizer which performs the operations integrally for an entire frame.

However, when the discrete cosine transformation and the frame-interpolation are performed for each of the blocks, image quality aberrations may occur due to change at the boundaries between the blocks. In order to avoid such an aberration in image quality at the boundaries, the frame synchronizer 10 comprises a low-pass filter 14 through which the frequency components of each block are outputted and by which the frequency components are smoothed in the frequency range.

The low-pass filter 14 receives frame-interpolated frequency components of each block and restricts them so that differences in frequency components between the blocks become less as the frequency of the frequency components becomes higher. Reverse transformation circuits 6A to 6Y receive the signals of the respective blocks outputted by the Low-pass filter 14, and reversely transform the received signals.

A reconstituting circuit 16 receives the output signals SAT to SYT of the reverse transformation circuits 6A to 6Y, and then outputs the signals in a predetermined order to reconstitute the image divided by the dividing circuit 12. Thus, in the frame synchronizer 10, after the transformation into the frequency range and frame-interpolation for each of the blocks, a color signal S2 is formed through the reconstituting circuit 16.

In the construction shown in FIG. 2, due to the transformation into the frequency range and frame-interpolation in units of individual blocks of a predetermined size or number, the frame-interpolation can be performed in such a manner that an isolated motion is dispersed in each of the corresponding blocks. Therefore, degradation of image quality is effectively avoided, and natural images can be obtained.

Other Embodiments

Figure 3:
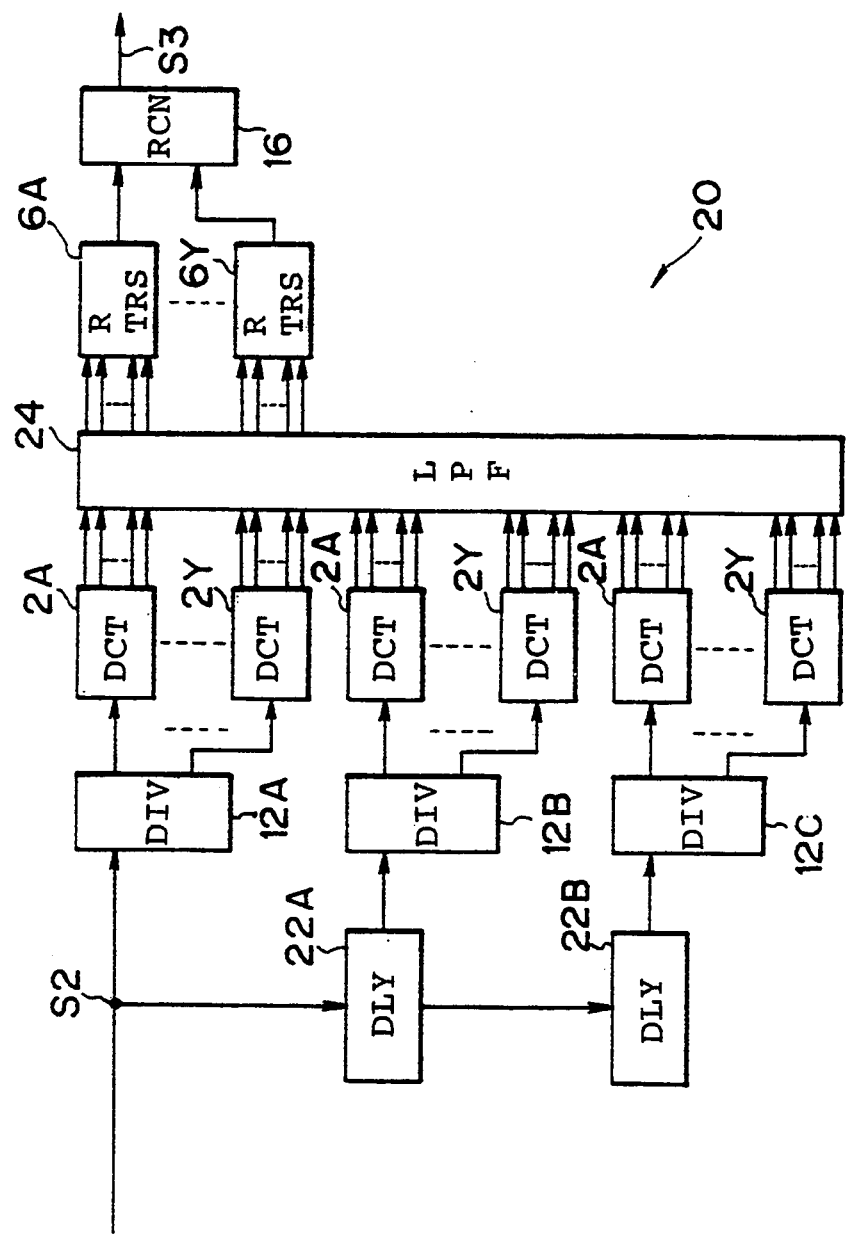
FIG. 3 is a block diagram of a third embodiment of the present invention.

Though, in the second embodiment, frequency components of each block are corrected so that image quality at the boundaries between the blocks will not be unnatural, the present invention is not limited to such an embodiment. Frequency components may be corrected so that a motion will not become unnatural from frame to frame, FIG. 3 shows a frame synchronizer 20 constructed for such a purpose. In the frame synchronizer 20, transformed color signals S2 are delayed by delay circuits 22A and 22B, and then are divided into blocks by dividing circuits 12A, 12B and 12C respectively. The color signals S2 contain signals of three frames. After discrete cosine transformation circuits 2A to 2Y transform the color signal S2 of each of the frames into the frequency range in units of individual blocks, the circuits 2A to 2Y output the signals to a low-pass filter 24.

The low-pass filter 24 restricts differences in the frequency components between the three frames by performing an inter-frame smoothing process. The low-pass filter 24 restricts the frequency components so that differences of higher-frequency frequency components between the frames are less.

Following the low-pass filter circuit 24, the reverse transformation circuits 6A to 6Y reversely transform the frequency signals of one frame, and a reconstituting circuit 16 reconstitutes the transformed frequency signals into a natural image. Thus, degradation of image quality is effectively avoided in the frame synchronizer 20.

Although, in the above embodiments, the frame-interpolation is followed by the smoothing process, the present invention is not limited by such embodiments. Frame-interpolated frequency components may be outputted through a non-linear type circuit to a reverse transformation circuit, in order to restrict the frequency components.

Further, though a color signal is processed in the above embodiments, the present invention is not limited by such embodiments but can be widely applied to frame interpolation of video signals such as processing of luminance signals or color difference signals.

Still further, though input signals are transformed into perpendicularly intersected frequency components by using the discrete cosine transformation technique in the above embodiments, the present invention is not limited by these embodiments but can be widely applied to a variety of transformations such as Hadamard transformation, Walsh transformation or slant transformation.

Still further, though the present invention is applied to frame synchronizers which change frame frequencies in the above described embodiments, it is not limited by these embodiments but can be widely applied to image transforming devices which perform frame-interpolation of video signals.

As described above, according to the present invention, image transformation is performed by transforming video signals into a spatial frequency range and by reversely transforming such signals. A portion moving isolatedly in a frame can be frame-interpolated in such a manner that the isolated motion is dispersed over the entire frame. Thus, the present invention provides an image transforming device which can transform even an image containing an isolated moving portion into a natural image, effectively avoiding degradation of image quality.

While there have been described preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An image transforming device comprising:
   means for transforming an inputted video signal into perpendicularly intersected frequency components in a spatial frequency range;
   interpolating means for generating frequency components which are frame-interpolated according to a change in said perpendicularly intersected frequency components with a progression of frames; and
   means or reverse transforming said frame-interpolated frequency components reversely to the transformation effected by said means for transforming.

2. The image transforming device according to claim 1, wherein said means for transforming transforms a video signal for one frame.

3. The image transforming device according to claim 2, wherein the interpolating means performs frame-interpolation with frequency components of either a frame preceding said one frame or a frame subsequent to said one frame at a portion with a scene change.

4. An image transforming device comprising:
   means for dividing an image formed by a video signal into a plurality of blocks;
   means for transforming said plurality of blocks into perpendicularly intersected frequency components in a spatial frequency range;
   interpolating means for generating frequency components which are frame-interpolated according to a change in said perpendicularly intersected frequency components with a progression of frames;
   means for reverse transforming said frame-interpolated frequency components reversely to the transformation effected by said means for reverse transforming; and
   means for reconstituting signals output from said means for reverse transforming.

5. The image transforming device according to claim 4, further comprising:
   low pass filter means for restricting said frequency components outputted from said interpolating circuits so that differences in frequency components between the blocks become less as frequency of the frequency components becomes higher, and outputting to said means for reverse transforming the frequency components which pass said low-pass filter means.

* * * * *